United States Patent [19]

Glucksman

[11] Patent Number: 5,392,162
[45] Date of Patent: Feb. 21, 1995

[54] ILLUMINATED TRAVEL MAKE-UP MIRROR

[76] Inventor: Dov Z. Glucksman, 137 Larch Row, Wenhan, Mass. 01984

[21] Appl. No.: 785,168

[22] Filed: Oct. 31, 1991

[51] Int. Cl.⁶ ............................ G02B 7/18; F21V 33/00
[52] U.S. Cl. ............................ 359/872; 359/840; 362/137; 362/140; 362/142; 362/194
[58] Field of Search ............... 359/840, 871, 872, 879; 362/135, 136, 137, 140, 141, 142, 143, 144, 194

[56] References Cited

U.S. PATENT DOCUMENTS

| | | | |
|---|---|---|---|
| 1,930,244 | 10/1933 | Lewinsohn et al. | 362/136 |
| 2,258,540 | 10/1941 | Cressaty | 362/137 |
| 3,381,119 | 4/1968 | Brickman et al. | 362/137 |
| 3,381,120 | 4/1968 | Fleisher et al. | 362/141 |
| 3,526,763 | 9/1970 | Dorfman | 362/141 |
| 3,757,103 | 9/1973 | Walter | 362/141 |
| 4,361,981 | 12/1982 | Reiling et al. | 362/136 |
| 4,580,880 | 4/1986 | Watson | 359/855 |

FOREIGN PATENT DOCUMENTS 07002673 10/1947 Norway ................. 362/135

*Primary Examiner*—Ricky D. Shafer
*Attorney, Agent, or Firm*—Charles R. Miranda

[57] ABSTRACT

An illuminated travel make-up mirror comprising a frame for pivotally mounting a mirror used in applying make-up. Small incandescent bulbs are arranged in a frame in spaced and opposing parallel rows in juxtaposition with the mirror, with the bulbs being seated in parallel paraboloidal reflectors and having their filaments located at the focus of the paraboloid. The axes of the bulbs and of the reflectors in each row are inclined at an angle with respect to the frame and towards each other so that the light rays therefrom converge at a locus or point beyond the face of a user to maximize illumination of the user's face.

The bulbs are powered by electric batteries and switching impedance or resistance means are provided for dimming or reducing the intensity of the light rays. The mirror is provided with hinged front and rear covers and when folded towards each other allow the mirror to be self-supported for use on a flat surface.

2 Claims, 8 Drawing Sheets

ILLUMINATED TRAVEL MAKE-UP MIRROR

This invention relates to make-up mirrors for use in applying make-up to the face of a user and more particularly to portable travel mirrors which utilize incandescent bulbs powered by electric batteries or cells to provide adequate illumination to facilitate the careful application of make-up by a user.

BACKGROUND OF THE INVENTION

Illuminated travel make-up mirrors have found ready acceptance by women, particularly those who travel. A compact and light weight mirror is almost a necessity for women who wish to be well groomed on trips away from where they may have the proper facilities permitting the careful application of make-up. Too often, a hotel or other accommodation does not provide the necessary facilities because the mirror may be in an inconvenient place, such as above a dresser that does not provide for chairs to be brought close to the mirror or the available illumination may be too poor. A mirror in the bathroom may not be any better because it will be necessary to bend or crouch over the sink to somehow obtain the illumination adequate to avoid shadows on the face, or like problems.

Prior illuminated compact travel make-up mirrors, to a certain degree, obviate difficulties experienced above but there are drawbacks. Those mirrors which are battery operated have not gained the confidence of many women because in some instances the batteries are quickly drained or exhausted after a relatively short period of time. There is no worst annoyance then finding the mirror not useable because of dead batteries, especially when you are away from home and unable to quickly purchase the batteries.

Some prior mirrors reduce the drain on the batteries by underpowering the lamps to extend the operating life of the battery, but this has the concomitant drawback that a low level and inadequate illumination occurs, again to the annoyance of the user. There is a difficult compromise to make because it is known that as the light rays of an incandescent bulb leave the filament there is a scattering or diffusion of the rays and though it may illuminate the area adjacent the mirror to some extent, it does not focus the illumination where it should be, that is, on the object to be illuminated.

It is an object of the present invention to provide a novel, compact, and lightweight illuminated travel mirror which provides illumination of sufficient intensity to assist in obtaining and effecting a careful application of make-up.

It is another object to provide a make-up mirror which utilizes means for focusing and constraining light rays from illumination sources to provide areas of high intensity illumination on the face of a user.

It is a further object to provide a make-up mirror in which the light rays from illumination sources are positively directed along intersecting paths and planes to intersect or meet beyond the face of the user, at a locus, at a calculated distance from the mirror.

It is a still further object to provide a mirror in which front and rear hinged covers are unfolded to permit the mirror to be self supporting on a flat surface.

Another object is to provide a battery powered illuminated make-up mirror which maximizes the effective life of the batteries while at the same time providing effective high intensity illumination.

A still further object is to provide a novel make-up mirror with two kinds of light intensity and spectral color so as to simulate bright day lighting conditions as where fluorescent lighting is used, and on the other hand night-time lighting conditions, as where incandescent bulbs are used, in order to enable proper make-up as others would see the user's face under both conditions.

Another object is to provide a travel make-up mirror at low cost by constructing it from a relatively small number of simple, injection-molded parts.

SUMMARY OF THE INVENTION

The present invention provides an illuminated travel make-up mirror having front and rear covers, which when unfolded provide a self-supporting unit on any flat surface. The device comprises a supporting frame for pivotally carrying a double sided reflecting surface, one side having a planar mirror and the other side a concave, magnifying mirror. In one embodiment, both the mirrors and the frame are rectilinear in configuration and openings are provided along two parallel and opposing sides of the frame adjacent the perimeter of the mirrors. Arranged within the openings are paraboloidal reflectors which have seated in their bases, low voltage incandescent bulbs. The filament of each bulb is located at the focus of their respective paraboloidal reflector so that when the bulbs are illuminated the light rays from each bulb are constrained by the reflector to travel in restricted paths. The bulbs and reflectors of one row are arranged at an acute angle to the frame holding same, and the bulbs and reflectors in the other row are similarly angled but in an opposite direction to the other row so that the light rays from the rows converge at some locus at a calculated distance from the mirror.

In another embodiment of the present invention, the bulbs and the reflectors are arranged as described above but the bulbs in each row are additionally angled towards other bulbs in the same row so that the light rays from each row converge towards each other and meet at a locus in space, which in theory, is more of a point than a line of points of lights as is, obtained by the above described first embodiment.

The loci of intersecting or merging light rays of both embodiments are calculated to exist at a distance of about 12" to 16" away from the frame carrying the mirrors and the bulbs, it being known that on the average, the face of a user is approximately 10" away from the mirror so that the face will be disposed in the path of the light rays between the mirror and the locus. In the case of the last described embodiment, the light rays, as they impinge on the user's face, in theory, approach a circle, whereas in the first embodiment, the light rays will extend vertically along a, narrow rectangle which extends between the hair and the chin of the user.

The base of the frame and the front cover meet in a hollow cylindrically shaped container which accommodates the electric cells or batteries. Circuit connections are provided to power the incandescent bulbs and a switch is utilized to make the connection. Electrical impedance means such as a resistor, is arranged in the circuit to permit a dimming or a lowering of the intensity of the light rays, when desired. The switch is arranged and constructed to be moved to an OFF position when the front cover is closed.

Another novel feature of the invention is the utilization of simple and relatively inexpensive components, in which the paraboloidal reflectors, for example in each row, are molded in one piece to greatly reduce the cost in fabrication and provide quick assembly of the reflectors to the frame. Covers, or lenses, are also provided for the reflectors which similarly are formed in one piece to the same advantage.

The invention contemplates another configuration of frame and reflecting surface, where the mirror is circular and the frame has one side which is arcuate to conform to an arcuate segment of a mirror, and two opposed sides which are parallel to each other and rectilinear in shape. Incandescent bulbs and reflectors are provided in the frame, in juxtaposition to the mirror, along three sides, the arcuate, and the opposed parallel sides.

PRIOR REFERENCES

The present applicant was issued U.S. Pat. No. 4,819,353 on Apr. 11, 1989 for ILLUMINATED PICTURE FRAME. This patent discloses the utilization of a plurality of incandescent bulbs fixed in the focus of an elongated parabolic reflector. The light rays from the bulbs are directed toward an adjacent photograph in a frame which also carries the reflectors and the bulbs.

Another prior reference is U.S. Pat. No. 3,908,119 to N. J. Zeytoonian issued on Sep. 23, 1975 for Illuminated Inspection Devices. The patent discloses a device having a mirror, and in FIGS. 5 through 8, a rectilinear mirror with a single prefocused incandescent lamp on each side of the mirror. The lamps are inclined towards each other and an acute angle to the mirror to avoid subjecting the eyes of the user to the direct glare of the bulbs.

BRIEF DESCRIPTION OF THE DRAWINGS

In the accompanying drawings, preferred embodiments of the invention are illustrated

DETAILED DESCRIPTION OF THE DRAWINGS

Figure 1:
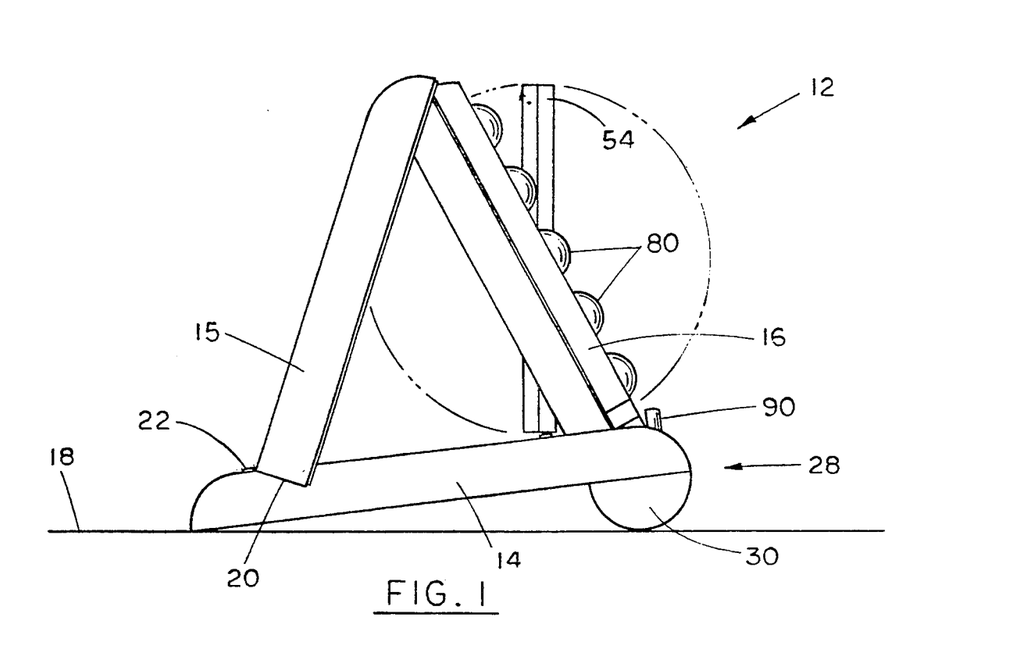
FIG. 1 is a side elevational view of the travel make-up mirror of the present invention in its open and unfolded self-supporting position and the mirror in a tilted position.

Referring now to the drawings, and more particularly to FIG. 1 thereof, the make-up mirror of the present invention is shown generally designated by the reference character 10 and comprises a front cover 14, a rear cover 15 and a frame 16. Covers 14 and 15 are shown in unfolded positions in FIG. 1, with cover 14 resting on a flat surface 18 of a table or desk (not shown) and a lower edge 20 of rear cover 15 engaging a pair of projections 22 (only one showing) on front cover 14 to restrain movement of cover 15 to provide an effective self-supporting position of mirror 12.

Figure 2:
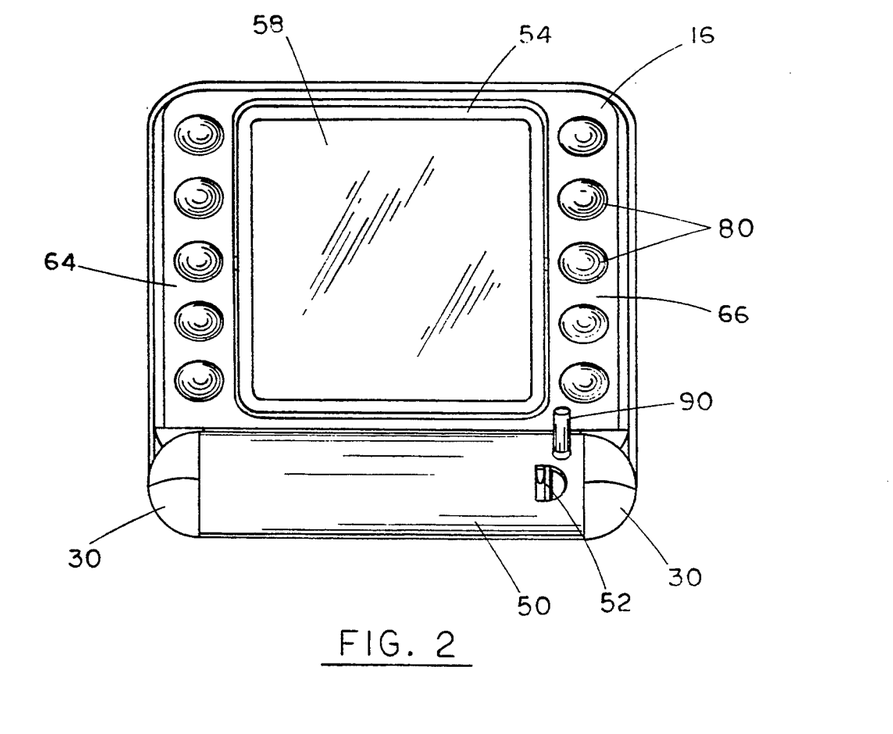
FIG. 2 is a front elevational view of the mirror of FIG. 1.
Figure 5:
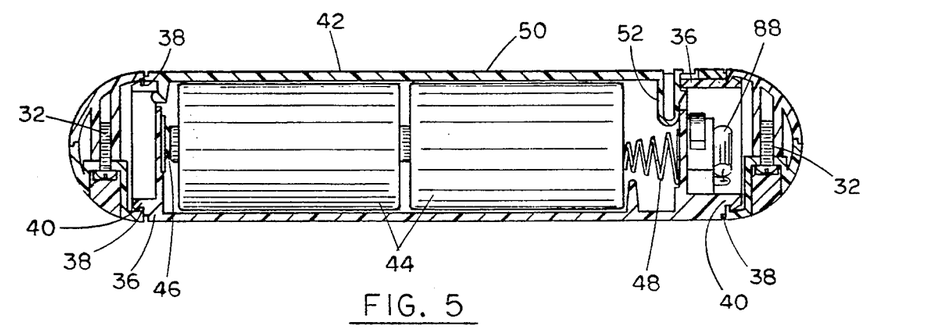
FIG. 5 is a sectional view of the battery compartment taken along the line 5—5 of FIG. 3.

Rear cover 15 is hinged to the top of frame 16 (best shown in FIGS. 6 and 6A) by pins 24 in the interior of frame 16 and an extension 26 formed on rear cover 15. Front cover 14 is provided at the end 28, adjacent the lower portion of frame 16, with a pair of hemispherical split spaced end pieces 30 (FIGS. 1, 2 and 3) secured together by screws 32 (FIG. 5) and journaled for rotation about dependent circular shaped end members 36, provided with recesses 38 in which extensions 40 on end pieces 30 ride. The lower end of frame 16 is constituted by a hollow cylindrical portion 42, the opposite ends of which are defined by end members 36 and accommodate a pair of electrical cells or batteries 44. Obviously, the number or size of batteries may be varied without departing from the spirit and the scope of the invention. Terminals 46 and 48 are provided in cylindrical portion 42 for contact with batteries 44. Cylindrical portion 44 is split longitudinally to provide a removable half portion 50 which is removed by operating a latch 52 (FIGS. 3 and 5).

Figure 3:
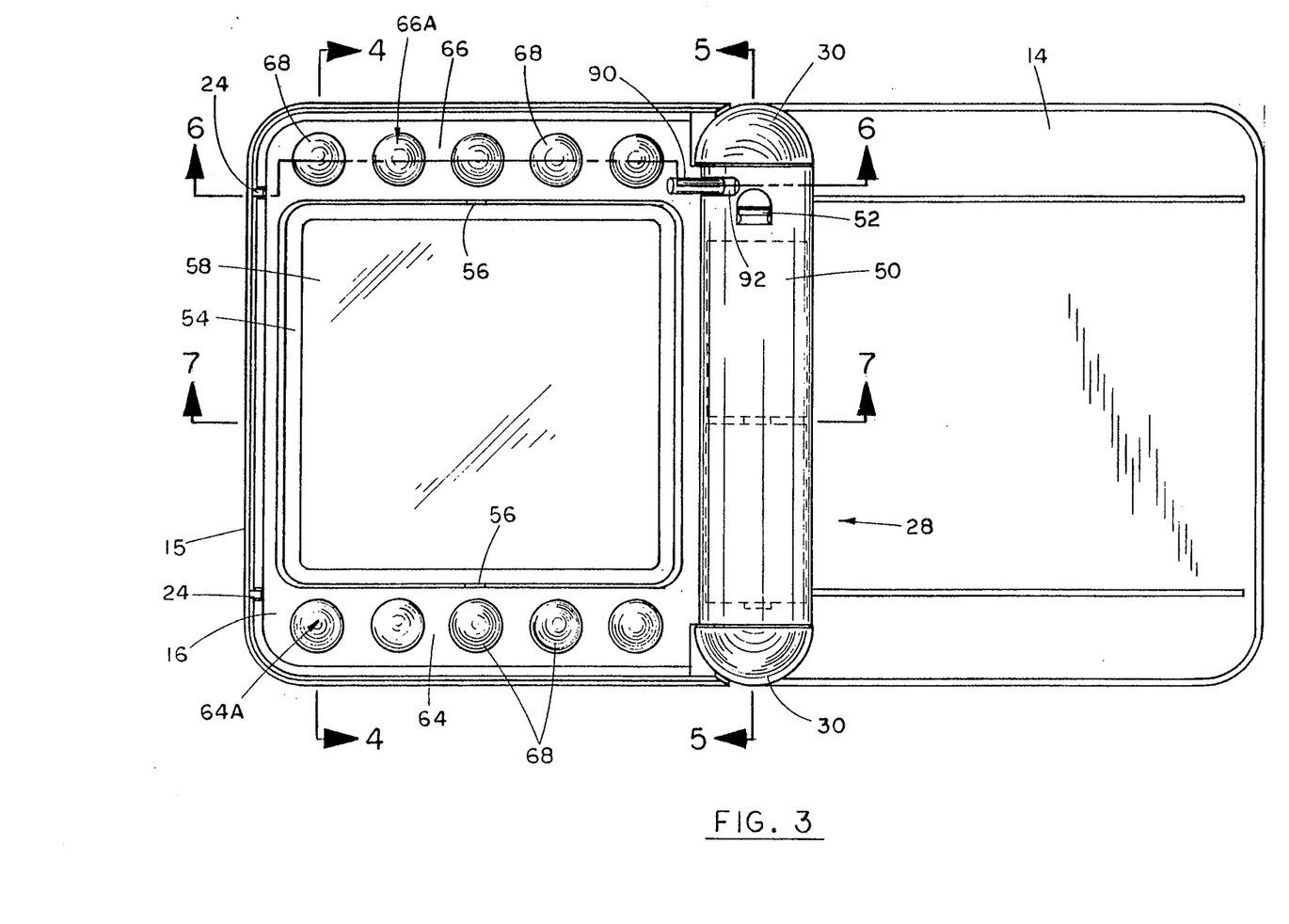
FIG. 3 is a plan view of the mirror of FIG. 1, with the front cover in extended horizontal position.
Figure 4:
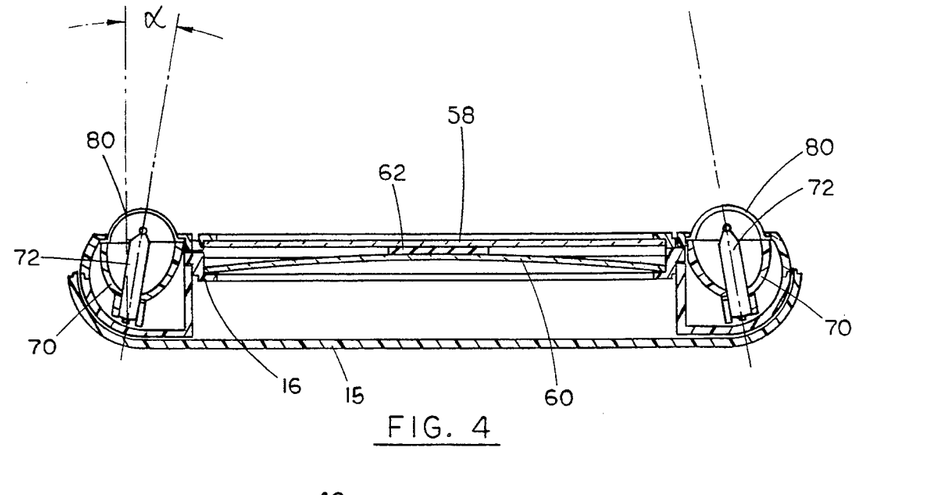
FIG. 4 is a transverse cross-sectional view taken along the line 4—4 of FIG. 3.

Frame 16 is rectilinear in shape and in the embodiment of FIGS. 1 and 3 has an opening to accommodate a mirror frame 54 which is pivotally mounted on frame 16 by pivot pins 56. Mirror frame 54 carries a planar mirror 58 (FIG. 4) and a concave magnifying mirror 60 cemented at 62 to mirror 58. Thus, as may be seen in FIG. 1, either mirror may be rotated to be viewed by the user, as desired. Frame 16 has a pair of opposing margin flat surfaces or sides 64 and 66 (FIG. 2 and 3), each of which has five openings 68 formed in proximity to mirrors 58 and 60, to form rows 64A and 66A, respectively.

Figure 14:
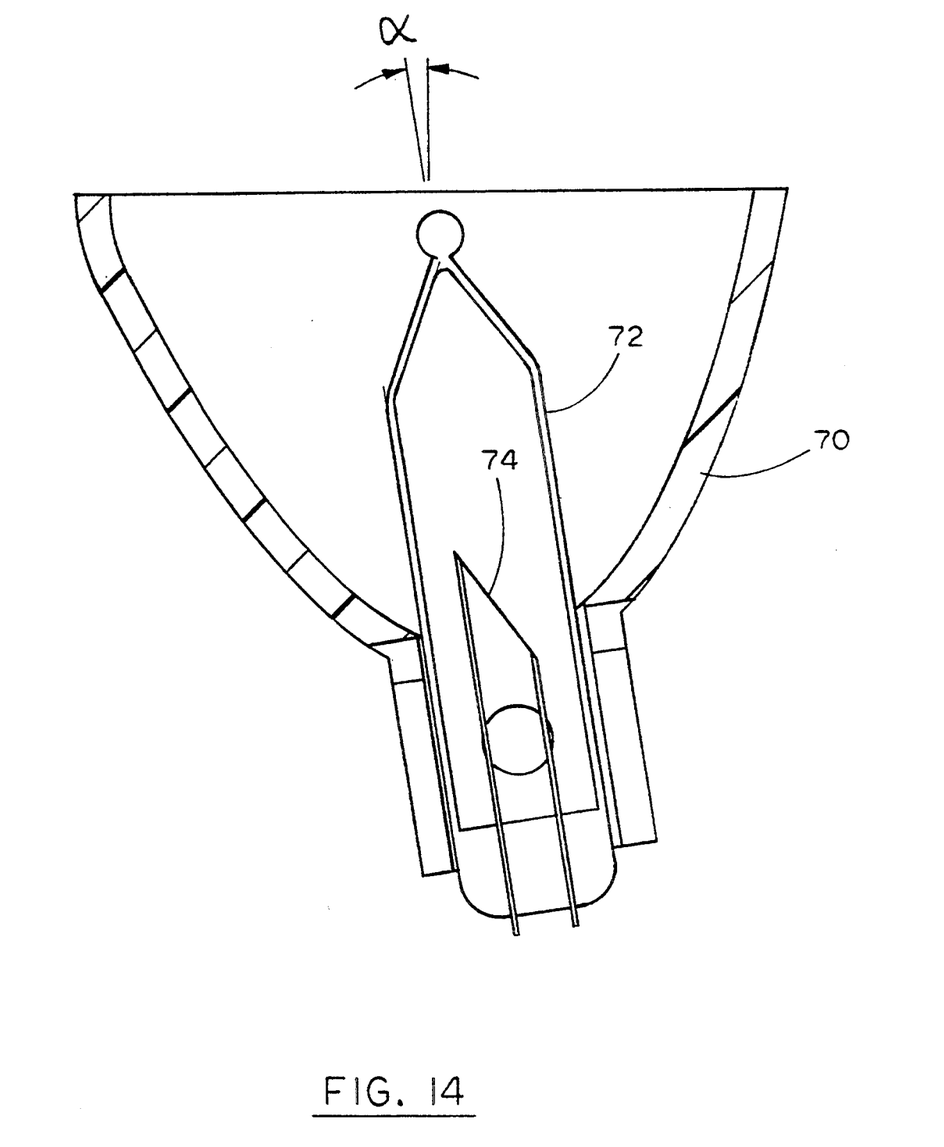
FIG. 14 is a sectional view of the paraboloidal reflector and the placement of the incandescent bulb therein with the bulb filament disposed approximately in the focal point of the paraboloid.

Each of the openings 68 is provided with a paraboloidal reflector 70 which is shown in enlarged cross-section in FIG. 14. The reflector surface is made highly light reflective by metal plating and its axis is inclined with respect to a plane perpendicular to the plane of frame 16 to form an angle α as best seen in FIG. 14.

Figure 8:
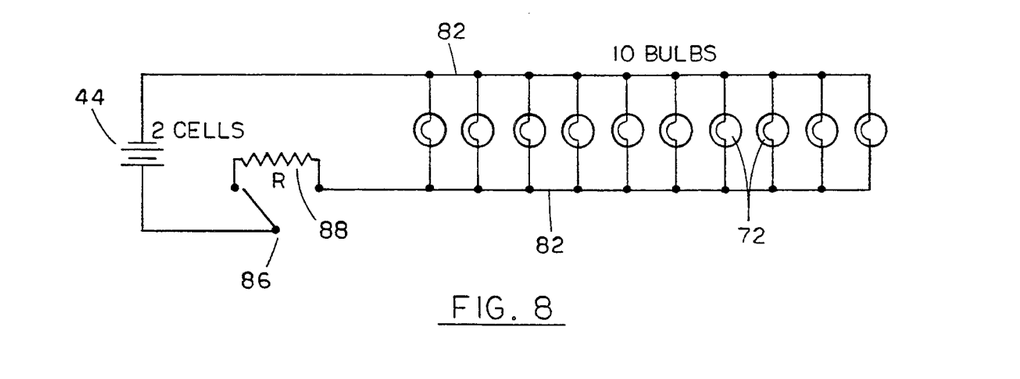
FIG. 8 is a schematic diagram of the circuit employed in the make-up mirror of FIG. 1.

Disposed within each reflector 70 is a low voltage incandescent lamp 72 each of which has a filament 74 which is positioned approximately in the focal point of a paraboloid shown in cross section in FIG. 14. The reflectors 70 in each of rows 64A and 66A are molded as a single integral piece and include interconnecting webs 75 which are provided with openings 76 which seat in projections 78 formed in frame 16. Each reflector 70 and bulb 72 is covered by transparent hemispherical lenses or covers 80 which are similarly single piece, and injected molded, and are provided with webs and openings aligned with openings 76 and reflectors 70. In this manner, the single piece injection molding of the reflectors and lenses obviates the need for a multiplicity of separate pieces and reduces the costs and effort of the assembly of the subject make-up mirror. Disposed beneath and in contact with each row of bulbs 72 is a printed circuit element strip 82 (FIG. 6, 6A and 8) which connect bulbs 72 of each row in parallel (FIG. 8). The schematic of FIG. 8 shows the electrical equivalents of the bulbs 72 as well as batteries 44. A moveable switch 86, has one terminal connected to one side of batteries 44 and the other side presents a movable contact or terminal for engagement with one end of an impedance means or resistor 88 in circuit with the bulbs 72. It will be understood that when switch 86 is in the position shown in FIG. 8, resistor 88 is inserted into the circuit and operative to reduce the voltage to bulbs 72 to dim or reduce the intensity of illumination; and when the switch is actuated to contact the other end of resistor 88, the resistor is disconnected from the circuit to an impress the full voltage from the batteries 44 across the bulbs 72 to provide a higher intensity of illumination. Switch 86 has a third position, not identified in FIG. 8, where it disconnects or breaks the circuit between the bulbs and the batteries and which may be characterized as an OFF position of the switch. Switch 86 is mechanically represented in FIG. 6 and 6A as having a pivotal switch arm 90 extending through an opening 92 formed in end members 36. Arm 90 lies in the path of travel of front cover 14 so that when the latter is swung to its closed position it engages arm 90 to actuate the switch to the OFF position. On the other hand, when the front cover is fully opened as in FIG. 1, switch arm 90 may be manually moved to an ON position to provide full illumination of bulbs 72, or to a third or DIM position to reduce the illumination of bulbs 72.

Prior battery operated make-up mirrors did not satisfy the user in their application of make-up because too often the light rays from the incandescent bulbs were scattered or diffused and the light rays individually, or in the aggregate, did not have the proper intensity to adequately illuminate the user's face. To correct such problems some prior devices increase the size or output of the bulbs but this caused earlier failures or exhaustion, or depletion of charge of the batteries, again to the extreme annoyance of the user.

The present invention overcomes these and other problems and disadvantages. In conceiving the present invention, the subject inventor first established that the user generally held her face approximately 10" away from the mirror to apply her make-up. Knowing this and applying certain geometric principles, the inventor conceived the use of oppositely disposed sources of illumination which were so inclined with respect to each other that the light rays from the opposite rows converged upon each other at a locus beyond the place where the user's face would be positioned. In effect, when the user's face was placed approximately 10" away from the mirror, the converging light rays would impinge upon the user's face to brightly illuminate same.

Figure 6:
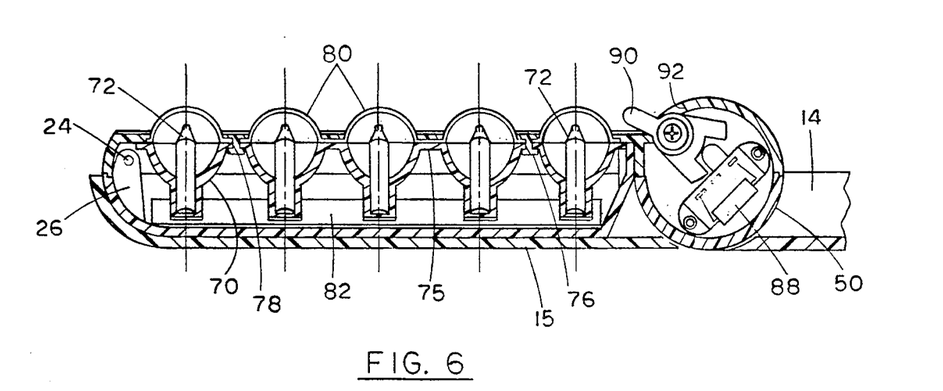
FIG. 6 is a sectional view taken along the line 6—6 of FIG. 3 and showing in particular the inclined arrangement of incandescent bulbs.
Figure 10:
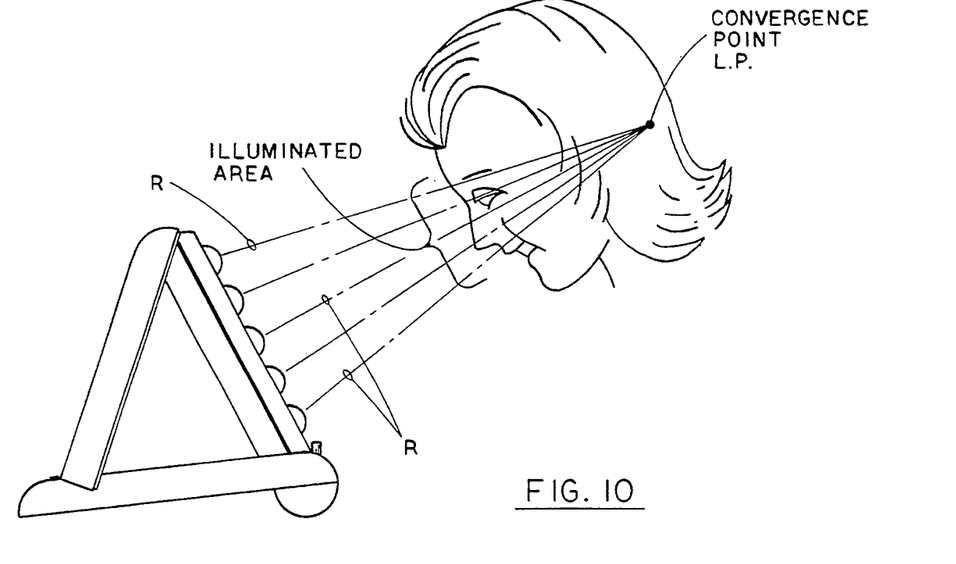
FIG. 10 is a view similar to FIG. 1 but showing the path of travel of light rays from the illumination source arrangement of FIG. 6A.
Figure 11:
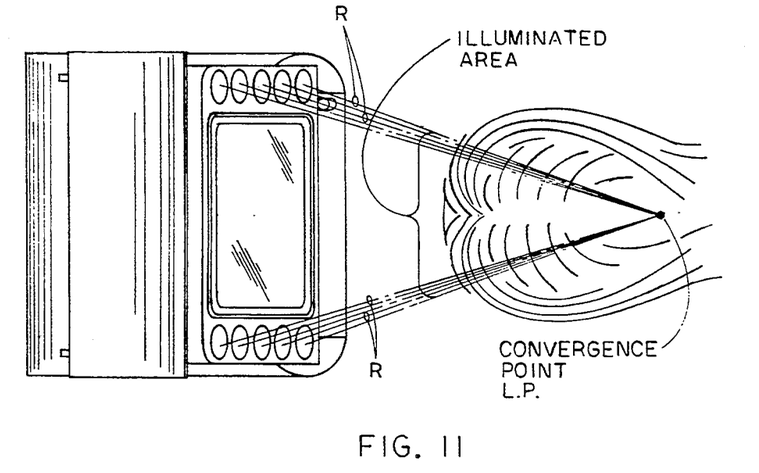
FIG. 11 is a view similar to FIGS. 2 and 10 and showing a plan view of the convergence of the light rays from the arrangement of 6A.
Figure 12:
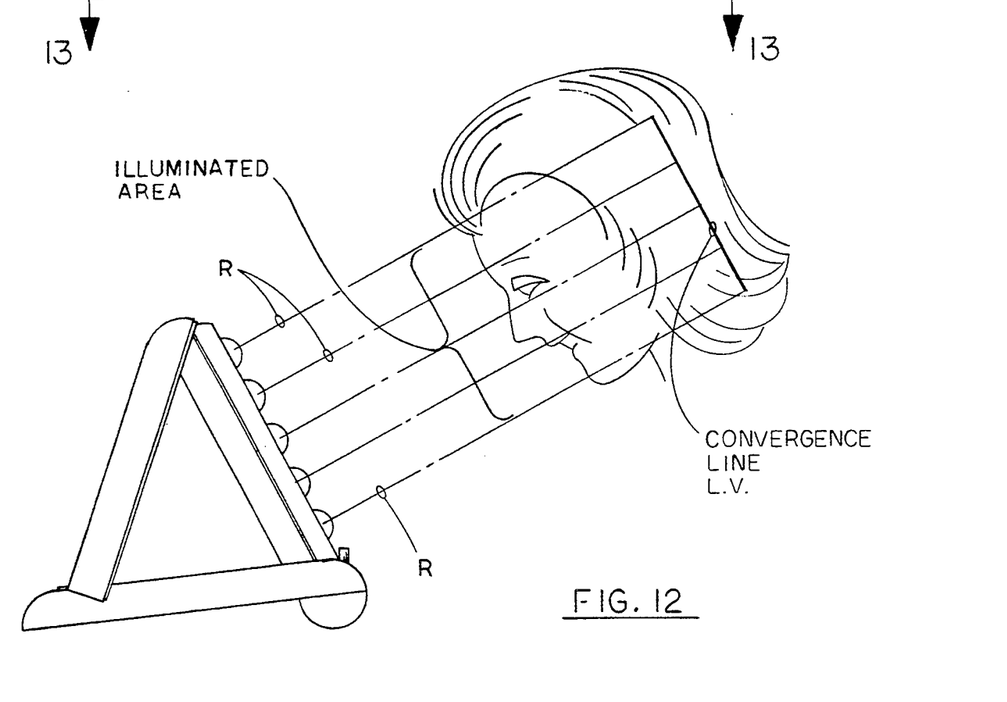
FIG. 12 is a view similar to FIG. 1 but showing the path of travel of light rays from the illumination source arrangement of FIG. 6.
Figure 13:
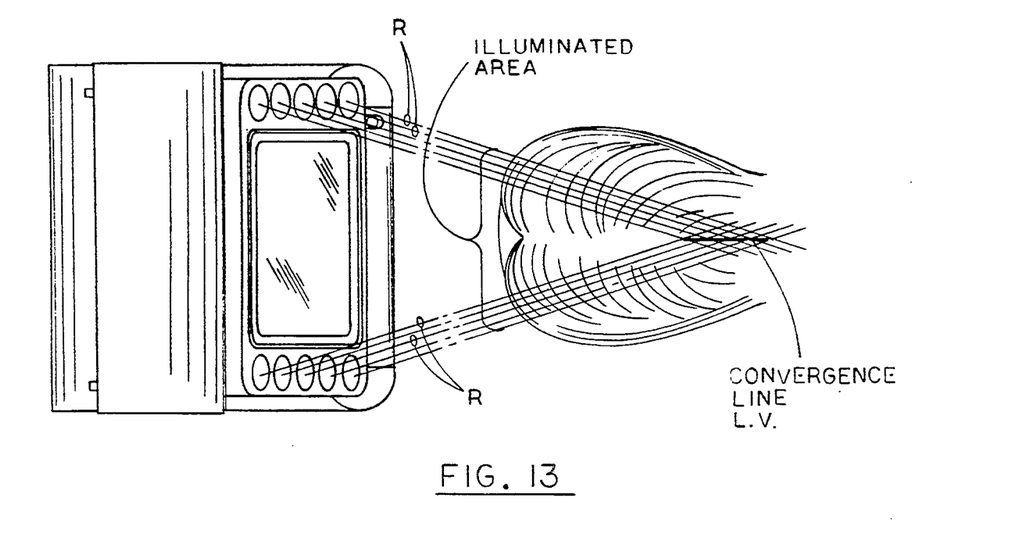
FIG. 13 is a view similar to FIGS. 2 and 12 but showing the path of travel of light rays from the illumination source arrangement of FIG. 6.

To this end, FIG. 6 shows one embodiment of the arrangement where all reflectors 70 and bulbs 72 in one row, for example row 64A, are inclined at an angle α and the opposing row 66A are oppositely inclined at the same angle α. Since filaments 74 are located in the focus of the paraboloidal reflector 70, a highly concentrated or restricted bundle of light rays issue from each reflector. To better illustrate the principle here, some liberty has been taken to represent the light rays in the drawings as issuing from each reflector as straight single lines. The light rays from bulbs 72 travel in paths which eventually converge or merge at a locus behind the face of a user as shown in FIG. 12. The locus in FIG. 12 may be represented by the line LV which illustrates how vertically disposed points of intense lights lie along line LV which are formed by correspondingly disposed pairs of bulbs in rows 64A and 66A. In effect, the light rays from each row of bulbs 72 travel in planes which intersect along the convergence line LV. The distance as calculated from frame 16 to the locus is approximately 12" to 16". By interposing the face of the user between the mirror and the locus, a region of high intensity light is generated on the user's face, as may be seen from FIGS. 12 and 13, which will permit careful application of make-up. This region of high intensity light or illumination appears substantially as a narrow vertical rectangle of light on the user's face. The embodiment shown in FIG. 6A, not only has the reflectors 70 and bulbs 72 inclined towards those in the other row, but in addition, the bulbs and reflectors in each row are inclined toward the bulbs and reflectors in the same row. This may be better understood by reference to FIG. 6A wherein the light rays "R" converge towards each other in the same row and the converged rays R from one row are inclined toward the light rays from the other row to travel along paths as shown in FIGS. 10 and 11 to converge at a point behind the user's face, In this embodiment, the locus of all the light rays converge to a locus represented as a point LP. FIGS. 10 and 11 clearly illustrate the convergence of light rays in regard to the face of the user and if a plane were taken transversely of the rays and parallel to frame 16 the configuration of the penetrating rays through the plane would approach a circle.

Figure 6A:
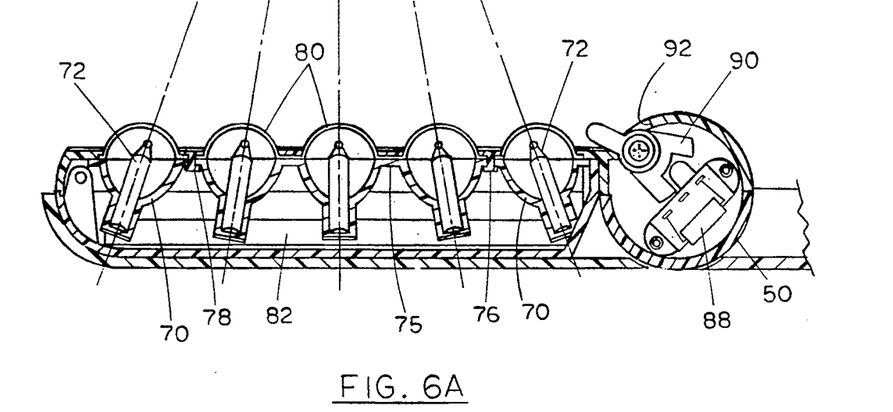
FIG. 6A is a sectional view, similar to FIG. 6, but constitutes another embodiment wherein the bulbs are not only inclined towards the mirror but also with respect to each other.
Figure 7:
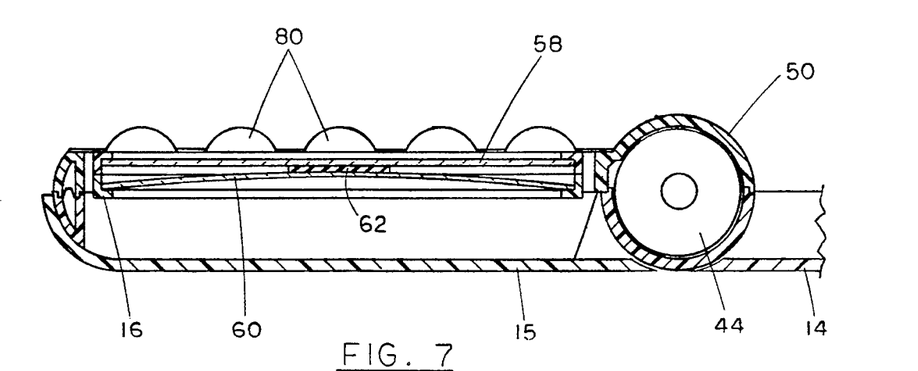
FIG. 7 is a sectional view taken along line 7—7 of FIG. 3.

In either of the embodiments of FIG. 6 and 6A, if the light rays were projected beyond locii LV and LP both the intensity of the light rays would diminish and there would be a scattering or diffusion of same. The preferred position from the standpoint of illumination accordingly, would be as shown in the drawings between the mirror and the locus. The embodiment of FIG. 6A provides a higher intensity illumination than that of FIG. 6 and therefore is preferable from that standpoint. However, the fabrication and assembly of the arrangement in FIG. 6A provides a less economical arrangement because the lenses and paraboloidal reflectors cannot be molded in one piece and therefore must be individually inserted and oriented in the frame 16. In a mass-produced device, the embodiment of FIG. 6 would be preferred over that of FIG. 6A.

It is well known that the make-up on a woman's face appears differently under strong florescent lighting or bright daylight conditions as contrasted with those conditions, generally during the evening, when rooms are lighted by incandescent lighting. Thus, it would be desirable to be able to view one's face in the mirror under either one of such simulated conditions. The present invention has the desirable feature of permitting the user to select one or the other. Where a woman is applying make-up with the intention of spending time subsequently in the bright or harsh lighting conditions mentioned above, the switch arm 90 would be manually displaced to the ON position. In that event, resistor 88 is disconnected from the circuit and full illumination from bulbs 72 is obtained. On the other hand, where make-up is being applied for the evening and the user expects to be in a room with incandescent or subdued lighting, then switch arm 90 is moved to the DIM position which results in the insertion of resistor 88 in the circuit. This reduces the voltage to the lamps 72 and consequently results in diminishing the intensity of the light rays therefrom.

Figure 9:
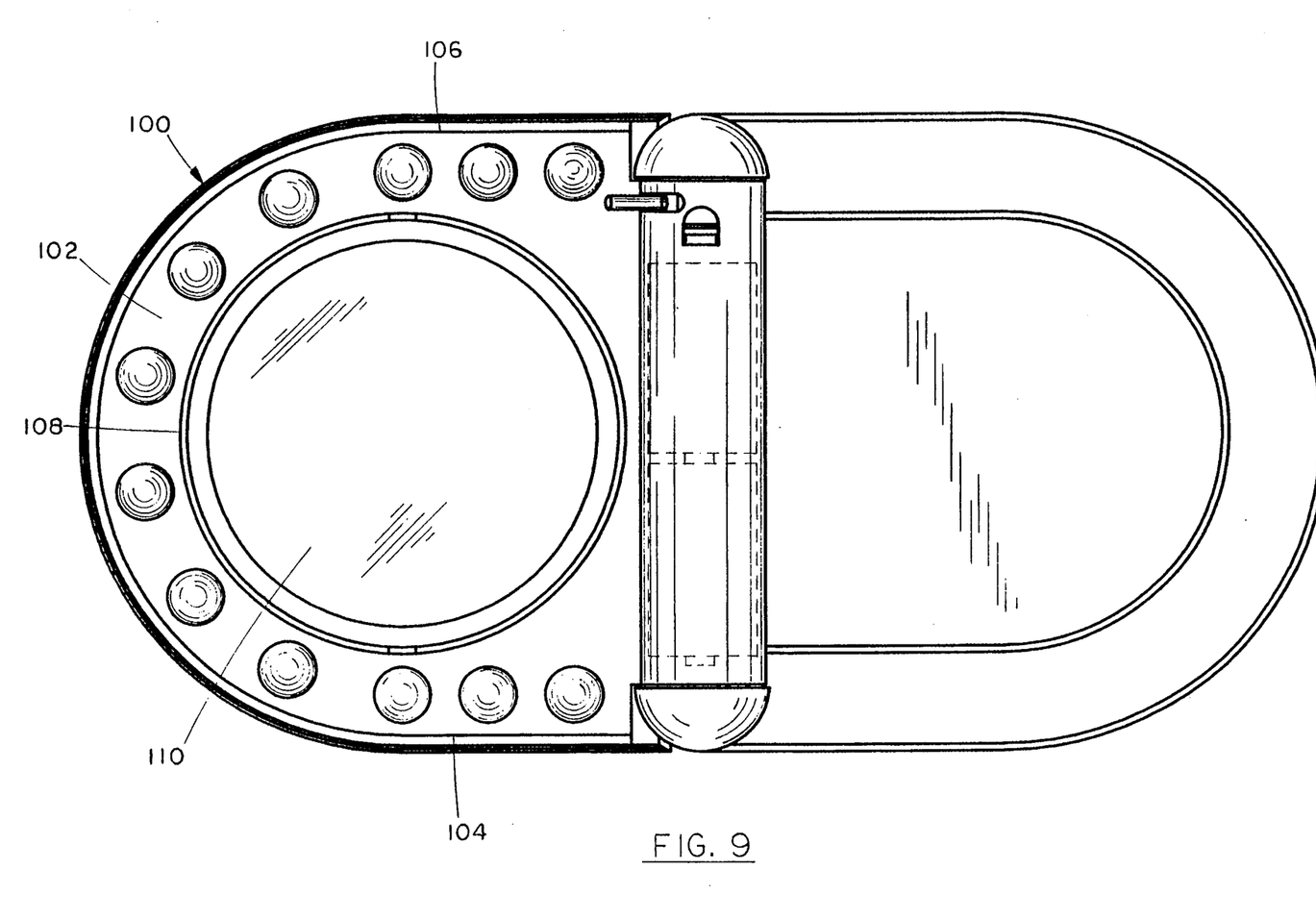
FIG. 9 is a plan view of another embodiment of the present invention with the front cover in extended flat position and showing a circular mirror with a conforming part arcuate and part rectilinear frame, carrying the mirror.

The present invention also contemplates make-up mirrors wherein the mirror is circular rather than rectilinear.. An example of this is shown in FIG. 9 wherein the make-up mirror generally designated by 100, is substantially the same as that of FIGS. 1, 2 and 3, except for some differences expressed hereinafter. Mirror 100 is provided with a frame 102 which has parallel opposed sides 104 and 106, and an arcuate side 108 which follows the contour of a segment of a circular mirror 110. The inclination of the bulbs and the reflectors disposed along the sides 104, 106 and 108 may be arranged much as in the embodiments of FIG. 6 or FIG. 6A without departing from the spirit and scope of the present invention. Obviously, and as shown, the front and rear covers follow the shape of frame 102 and operate as they do in the embodiment of FIGS. 1, 2 3.

The device thus disclosed is a substantial improvement over prior battery operated and illuminated travel make-up mirrors in providing high intensity illumination to enable a user to properly and carefully apply make-up for different lighting conditions. By providing low voltage in incandescent bulbs and paraboloidal reflectors inclined in the manner disclosed herein a most efficient and effective utilization of the electrical components is made. In effect, the life of the batteries is extended because less power for the bulbs is required, which in turn, equates to less expenditure of energy from the batteries. The subject device is compact, made of light weight plastic components, and large savings are obtained with the employment of one piece injection molded reflectors and lenses.

While the foregoing description illustrates various preferred embodiments of a travel make-up mirror in accordance with the present invention, it will be appreciated that certain changes and modification may be made without departing from the spirit and the scope of the invention.

What is claimed is:

1. An illuminated mirror for use in applying make up, comprising,
    a mirror mounted within a frame,
    a plurality of incandescent light bulbs disposed at the perimeter of the mirror arranged in space opposing rows,
    paraboloidal reflectors for each of said incandescent light bulbs which have their filaments located at the focus of their respective reflector with said reflectors and bulbs of each row being inclined toward the other,
    transparent lenses are provided for each reflector and said lenses are molded as one piece, and the reflectors of each row are molded in one piece, said reflector constraining the light rays to travel in restricted paths converging to a locus at a calculated distance from the mirror and said locus lying beyond the face of a user whereby the user's face intercepts said light rays prior to their reaching said locus to maximize illumination of the user's face.

2. A compact portable illuminated mirror for use in applying make-up, comprising
    a mirror,
    a frame in which the mirror is mounted,
    a plurality of incandescent bulbs arranged in opposing parallel rows along the frame and in juxtaposition to the mirror, paraboloidal reflectors provided for each bulb with the filament of the bulbs located at the focus of the paraboloid, the bulbs and reflectors in each of said rows being inclined toward the bulbs and reflectors of the other rows so that the light rays from each row of bulbs converge toward the light rays from the other row of bulbs,
    a cover for said mirror having a hinge at one end of the frame, said frame including a hollow compartment for accommodating at least one electric cell, circuitry within said compartment for connecting the electric cell to the incandescent bulbs to energize same, said circuitry including an electric resistance means which when connected in the circuit reduces the intensity of the light rays emanating from the bulbs, and a switch for said circuitry is actuable to an off position, an on position, and a dimming position, said switch in the on position disconnecting the resistance from the circuit and in the dimming position inserting the resistance in the circuit.

* * * * *